(12) United States Patent
Schwarz et al.

(10) Patent No.: US 8,911,657 B1
(45) Date of Patent: Dec. 16, 2014

(54) METHOD OF MOLDING SIDING WITH CONTINUOUS RAIL

(71) Applicants: Stefan Schwarz, Coral Springs, FL (US); Bob Engel, Chicago, IL (US)

(72) Inventors: Stefan Schwarz, Coral Springs, FL (US); Bob Engel, Chicago, IL (US)

(73) Assignee: Exteria Building Products, LLC, Miami, FL (US)

( * ) Notice: Subject to any disclaimer, the term of this patent is extended or adjusted under 35 U.S.C. 154(b) by 194 days.

(21) Appl. No.: 13/644,494

(22) Filed: Oct. 4, 2012

Related U.S. Application Data (60) Provisional application No. 61/543,338, filed on Oct. 5, 2011.

(51) Int. Cl.
*B29C 45/44* (2006.01)

(52) U.S. Cl.
USPC .. 264/318; 264/328.1; 425/577; 425/DIG. 58

(58) Field of Classification Search
CPC ............ E04F 13/0851; B29C 45/4407; B29L 2007/002; B29L 2031/10
USPC ................. 264/328.1, 318; 425/577, DIG. 58
See application file for complete search history.

(56) References Cited

U.S. PATENT DOCUMENTS

| | | | | |
|---|---|---|---|---|
| 3,987,144 A | * | 10/1976 | Nickold | 264/318 |
| 4,353,522 A | * | 10/1982 | Anger | 249/144 |
| 5,895,621 A | * | 4/1999 | Tajiri et al. | 264/318 |
| 2007/0090570 A1 | * | 4/2007 | Cochran et al. | 264/318 |

* cited by examiner

*Primary Examiner* — Jill Heitbrink
(74) *Attorney, Agent, or Firm* — Drinker Biddle & Reath LLP (57) ABSTRACT

A mold assembly and method for forming a siding panel with an integral continuous rail are disclosed. The mold assembly includes a slide mold member, a lifter mold member, a stationary mold member and a rear mold assembly. The slide mold and lifter mold members include surfaces for forming the rail. Molten plastic is injected into the mold cavity and cooled. The lifter mold member is moved toward the molded siding so as to move the molded siding panel away from the stationary mold member. The slide mold member is moved away from a portion of the lifter mold member and toward the molded siding panel so as to move the molded siding panel away from the lifter mold member and causing the rail to flex as it slides over the convex portion of the lifter mold member.

8 Claims, 5 Drawing Sheets

METHOD OF MOLDING SIDING WITH CONTINUOUS RAIL

RELATED APPLICATION

This application is related to and claims priority from U.S. Provisional Patent Application No. 61/543,338 filed Oct. 5, 2011, which is incorporated herein by reference in its entirety.

BACKGROUND

Siding panels for building structures are traditionally made from either extrusions, in which case the siding panel typically does not include surface variations, or by injection molding, which permits molding of panels with many shapes and contours.

One of the limitations on injection molding of panels is the ability to remove the panels from the mold after the injection molding is complete. Most injection molds for siding are designed so that the molded panel can be easily ejected from the mold. Thus, such molds are generally fixed in shape and do not include many moving parts. However, fixed molds inhibit the ability to incorporate curved undercut components into panels, including mounting rails.

In previous methods for forming siding, rails have been formed on the front side of a siding panel by various methods, including folding the panel over on itself at the upper end, extruding the panel with the rail, or molding the rail as a separate piece and then affixing the separately molded rail to the panel. Most commonly, panels are manufactured with interrupted rail segments are used since they can be more readily fabricated. However, most contractors would prefer a continuous rail in order to facilitate installation.

SUMMARY OF THE INVENTION

The present invention is directed to a mold assembly for forming a siding panel having an upper portion with a continuous rail on one face thereof. The rail extends in a first direction along the siding panel and protrudes outwardly and extends in a second direction substantially perpendicular to the first direction and substantially parallel to an intermediate portion of the siding panel so as to form an elongated hook shape. The upper portion has an upper face surface and an upper back surface. The intermediate portion has a face juxtaposed and spaced apart from a rear surface of the rail. The siding panel has a lower portion located below and contiguous with the intermediate portion, the lower portion extending below the rail. The lower portion has a lower face surface and a lower back surface.

The mold assembly includes a slide mold member, a lifter mold member, a stationary mold member and a rear mold assembly. The slide mold member has a first surface for defining the upper face portion of the siding panel, a second surface extending from the first surface and having a generally concave surface adapted to form the outer surface of the rail, and a mold contact surface adjacent to and extending generally laterally away from the concave surface.

The lifter mold member includes a first surface for defining at least a portion of the face of the intermediate portion, a second surface with a generally convex surface portion extending from the first surface for defining the inner surface of the rail, a first mold contact surface adjacent to and extending generally laterally away from the convex surface, and a second mold contact surface adjacent to and extending generally laterally away from the first surface.

The stationary block mold member includes a first surface for defining at least a portion of the face of the lower portion, and a mold contact surface adjacent to and extending generally laterally away from the first surface.

Preferably the mold contact surface of the slide mold member is adjacent to and in contact with the first mold contact surface of the lifter mold member during at least a portion of the molding process.

Preferably the second mold contact surface of the lifter mold member is adjacent to and in contact with the mold contact surface of the stationary block mold during at least a portion of the molding process.

Preferably a portion of the slide mold member is adapted to slide along a portion of the lifter mold member.

A method of forming a siding panel are is also disclosed. The method involves the step of providing a slide mold member having a first surface for defining the upper face portion of the siding panel, a second surface extending from the first surface and having a generally concave surface adapted to form the outer surface of the rail, and a mold contact surface adjacent to and extending generally laterally away from the concave surface.

A lifter mold member is provided having a first surface for defining at least a portion of the face of the intermediate portion, a second surface extending from the first surface and having a generally convex surface for defining the inner surface of the rail, a first mold contact surface adjacent to and extending generally laterally away from the convex surface, and a second mold contact surface adjacent to and extending generally laterally away from the first surface.

The method also involves providing a stationary block mold member having a first surface for defining at least a portion of the face of the lower portion, and a mold contact surface adjacent to and extending generally laterally away from the first surface.

A rear mold assembly is also provided with a rear mold surface for defining the back surface of the siding panel.

The method includes the step of arranging the slider mold member and the stationary mold member adjacent to and on opposite sides of the lifter mold member, and the rear mold assembly so as to locate the rear mold surface adjacent to and spaced apart from the first surface of the slider mold member, the first surface of the stationary mold member, and the first surface of the lifter mold member so as to define a siding mold cavity in the spacing therebetween.

Next molten plastic is injected into the siding mold cavity and then allowed to cool to a temperature below its melting point so as to form the molded siding panel with a rail.

To remove the siding panel, the method involves moving the lifter mold member in a direction substantially perpendicularly to and toward the rear mold assembly so as to move the molded siding panel away from the first face of the stationary mold member. The slide mold member is moved in a direction substantially perpendicularly away from the first mold contact surface of the lifter mold member so as to separate a portion of the slide mold member from the lifter mold member. The slide mold member is also moved in a direction substantially perpendicularly to and toward the rear mold assembly so as to move the molded siding panel away from the first surface of the lifter mold member and causing the rail to flex as it slides over the convex portion of the lifter mold member.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE FIGURES

For the purpose of illustrating the invention, the drawings show a form of the invention that is presently preferred. However, it should be understood that this invention is not limited to the precise arrangements and instrumentalities shown in the drawings.

DETAILED DESCRIPTION

It is known in the art to provide siding for the exterior of a building in the form of thermoplastic siding panels that are mounted so as to interlock in overlapping horizontal courses or rows, as shown for example in U.S. Pat. Nos. 7,980,027, 6,715,250, and 5,537,792, the disclosures of which are incorporated by reference herein in their entirety.

Figure 1:
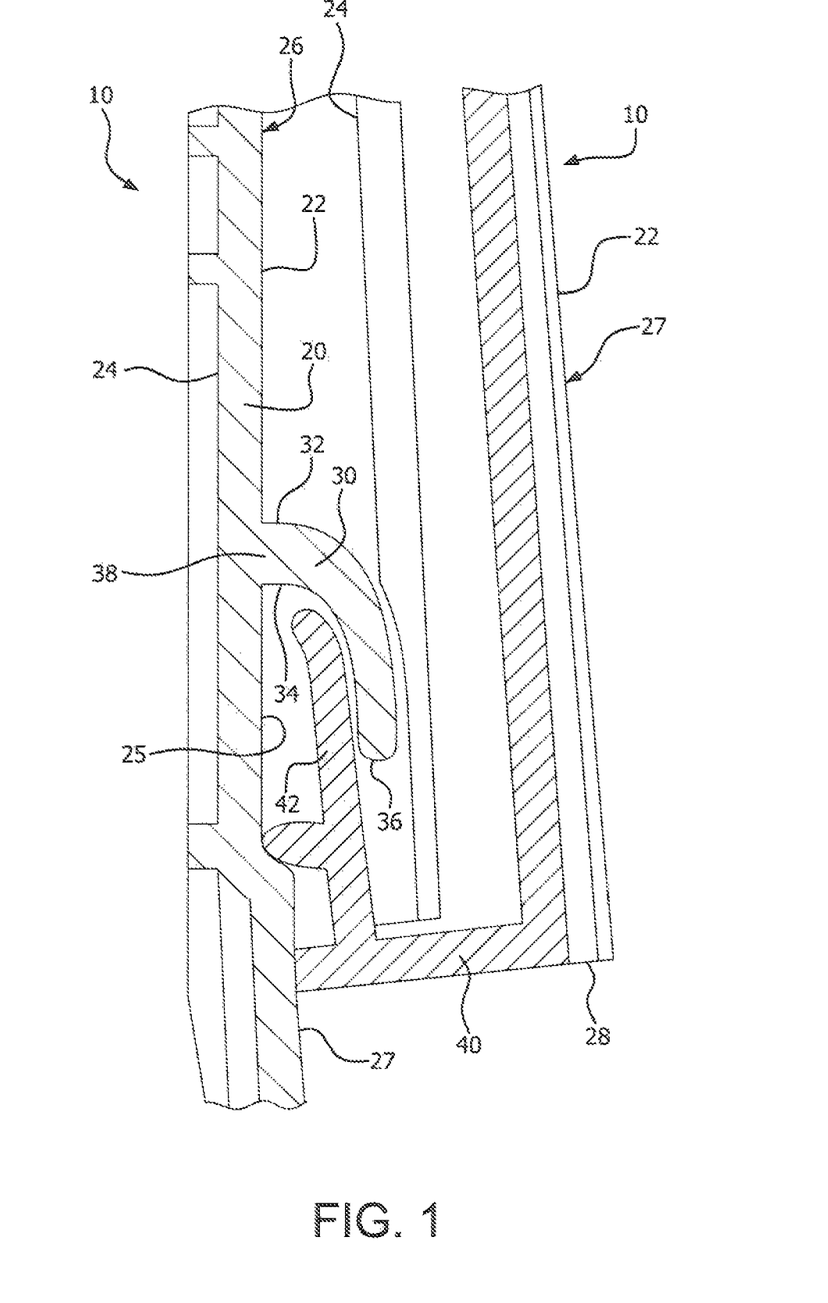
FIG. 1 is a side view showing the engagement of a continuous rail which extends from a front side of a first siding panel with a mating flange which extends from the rear side of a second siding panel positioned on top of the first siding panel on the exterior of a building.

FIG. 1 shows a configuration for interlocking a pair of overlapping siding panels 10. Each siding panel 10 includes a panel body 20 having a front side 22 and a rear side 24. An upper end portion 26 of each siding panel 10 includes a mounting rail 30 that is curved or hooked to extend frontwardly from the front side 22 of the panel body 20 and downwardly from the upper end portion 30 as shown. The rail 30 extends from the front side of the panel body 20 at a base 38, and includes an outer surface 32, an inner surface 34, and a tip 36. A intermediate portion 25 of the panel body is located below the upper end portion 26 and includes a portion of the front side that is positioned laterally behind the rail 30 and spaced apart from the inner surface 34. A main portion 27 of the body panel 20 is positioned adjacent to and extends downward from the intermediate portion 25 and defines a segment of the front side 22 and is preferably textured or contoured to provide a cosmetic, visual or tactile appearance to the siding panel 10 when mounted. The upper end portion, intermediate portion and main portion are preferably contiguous so as to form a continuous molded siding panel 20. A lower end 28 of each siding panel 10 includes a rearwardly extending flange 40 and a lip 42 that extends upward from the rearwardly extending flange 40. The rail 30 preferably narrows or tapers at least slightly from the base 38 to the tip 36 so as to provide a stiffer base 38 than tip 36.

When installing overlapping courses of siding panels 10, a first panel 10 is mounted to the exterior of a building using a nailing fin (not shown) located in the upper end portion 26 of the panel 10. A second panel 10 is mounted above the first panel 10 by engaging the lip 42 of the second panel 10 with the rail 30 of the first panel 10, and then mounting the second panel 10 to the exterior of the building using its nailing fin. Thus, the nailing fin of each panel 10 retains the upper end portion 26 of the panel 10 against the building exterior, while the lip 42 and the flange 40 of each panel retain the lower end 28 of the panel 10 against an underlying panel 10 via engagement with the rail 30 on the underlying panel 10. The inner surface 34 of the rail 30 of the first panel 10 contacts the lip 42 of the overlapping second panel 10, while the outer surface 32 of the rail 30 of the first panel 10 contacts the rear surface 24 of the second panel 10. The lip 42 may be chamfered or rounded to facilitate the engagement between the rail 30 and the lip 42.

Disclosed herein are embodiments of a method of forming the rail 30 integral to the panel 10 by injection molding, wherein the rail 30 and the panel 10 are molded together at the same time. The disclosed methods have overcome the difficulties inherent in the injection molding of undercut forms, such as the hook-shaped rail 30.

Figure 2A:
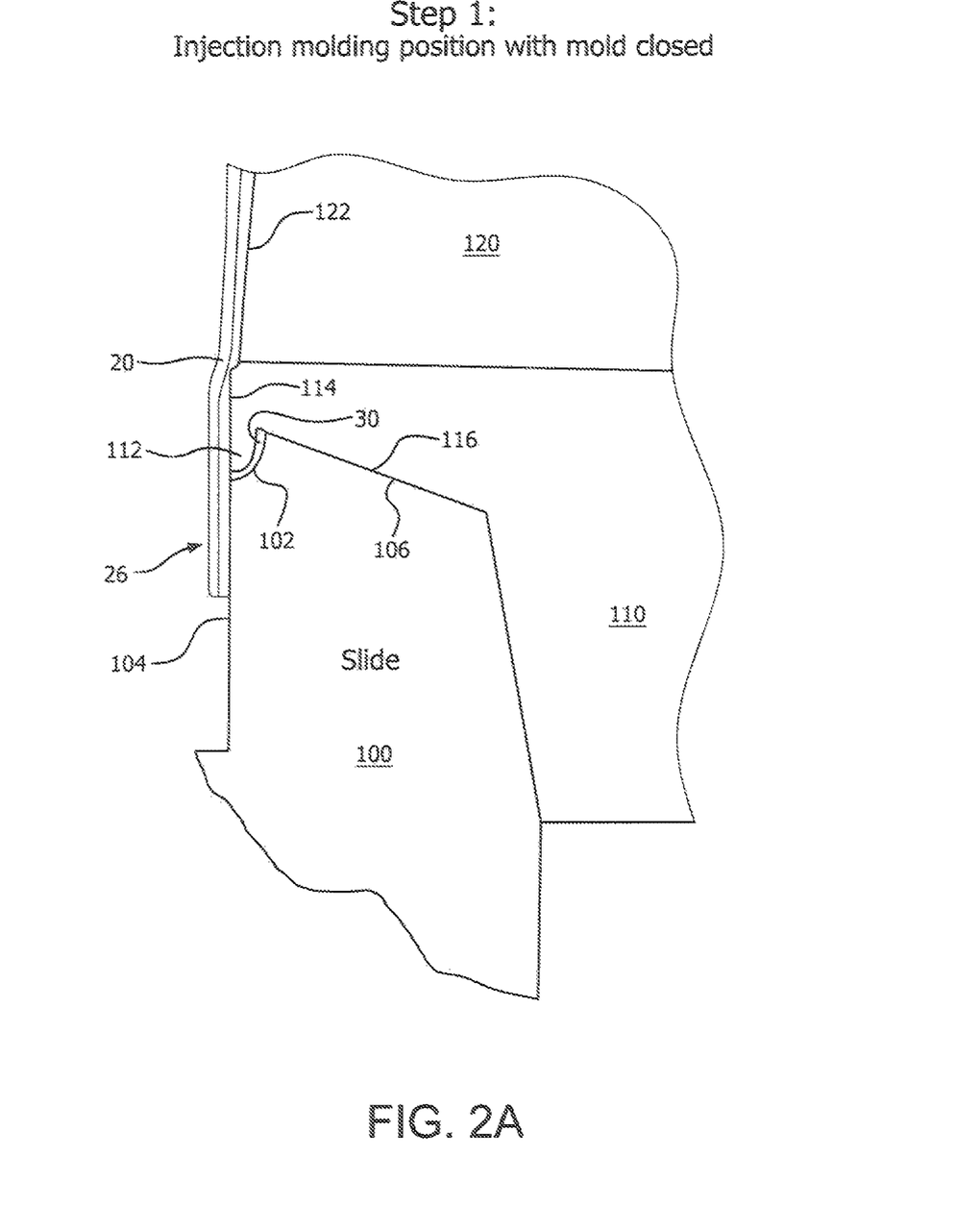
FIG. 2A is a side view showing a first step in an embodiment of a molding process in which a siding panel having continuous rail is injection molded, the continuous rail being formed in a cavity between a lifter mold and a slide mold.
Figure 2B:
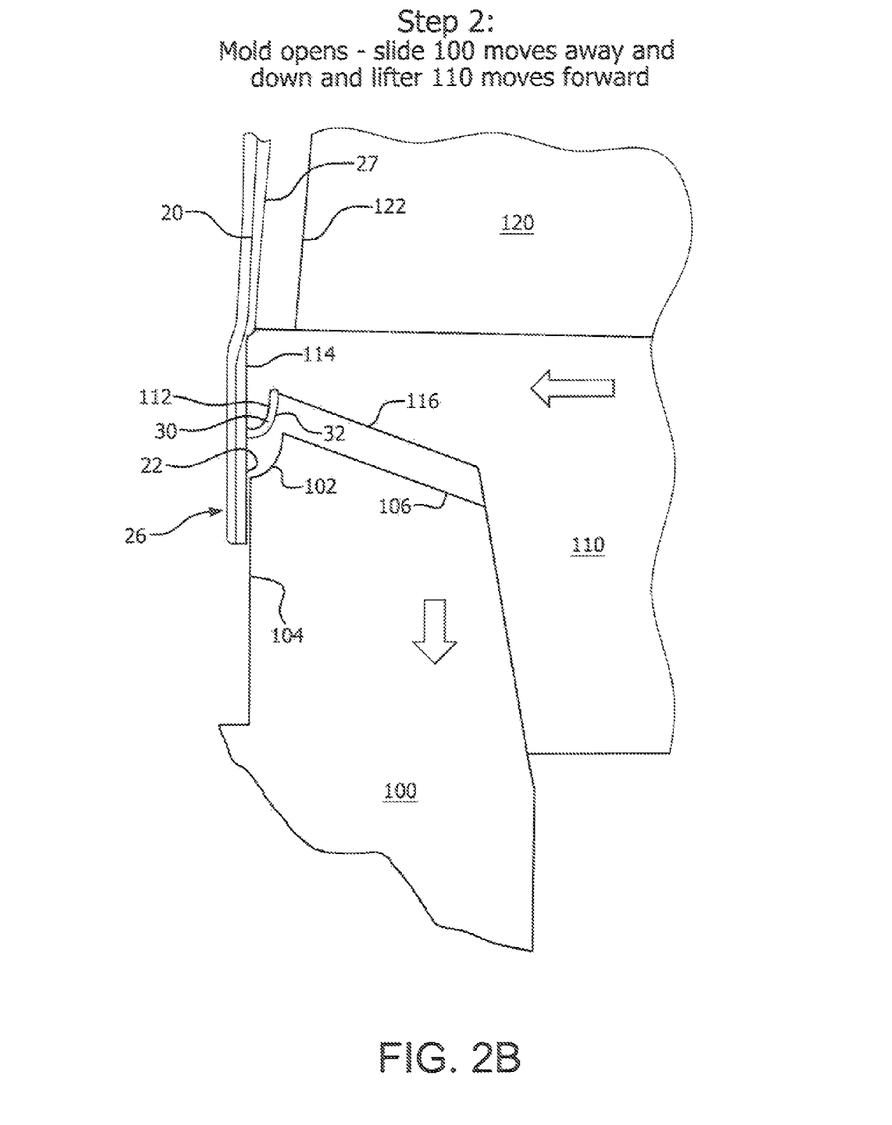
FIG. 2B is a side view showing a second step in the molding process of FIG. 2A, in which the slide mold is moved away from the lifter mold with a component of the movement being parallel to the siding panel, thereby exposing an outer surface of the continuous rail.
Figure 2C:
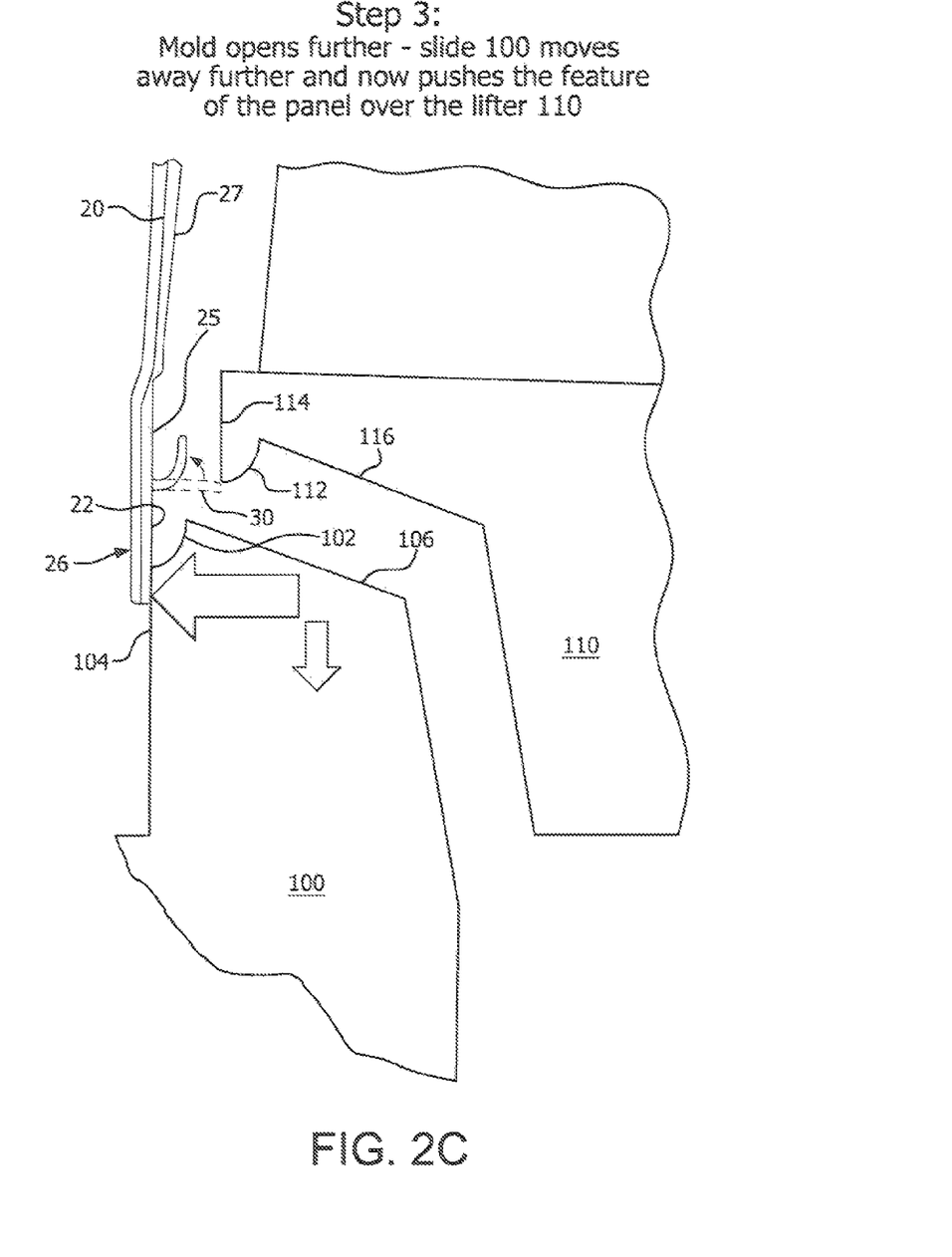
FIG. 2C is a side view showing a third step in the molding process of FIGS. 2A and 2B, in which the slide mold is moved away from the lifter mold with a component of the movement being perpendicular to the siding panel, thereby flexing the continuous rail and releasing the continuous rail from the lifter mold, and exposing an inner surface of the continuous rail.

One embodiment of an injection molding method is shown in FIGS. 2A-2C, which depict forming the front side 22 of a siding panel 10. Three front-side mold members are depicted on the front side 22 of the panel body 20, including a slide mold 100, a lifter mold 110, and a stationary block mold 120. (Not shown are one or more rear-side mold members used to form the rear side 24 of the panel body.) The mold members are typically made from metal, typically steel, and are optionally water-cooled to enable cooling and hardening of the molded thermoplastic siding panel 10.

The slide mold 100 and the lifter mold 110 are shaped to define a cavity for forming the rail 30. The stationary block mold 120 is manufactured to include a generally planar surface 122 that may be textured as desired to form the main portion 27 (i.e., the visible portion, when mounted on a building) of the front side 22 of the panel body 20. The slide mold 100 is manufactured to include a preferably generally planar face 104 for forming a part of the front side 22 of the upper end portion 26 of the panel body 20, and a generally concave surface 102 for forming the outer surface 32 of the rail 30. The lifter mold 110 is manufactured to include a generally planar or contoured face 114 for forming a part of the front side 22 of the panel body 20, and a generally convex surface 112 for forming the inner surface 34 of the rail 30. The slide mold 100 and the lifter mold 110 contact one another at corresponding surfaces 106 and 116, which are configured to enable the slide mold 100 to move away from the lifter mold 110 in two directions, perpendicular to and parallel to the front side 22 of the panel body 20.

Prior to molding, the mold is closed to place the front-side mold members and the rear-side mold member(s) in proximity to each other, leaving a complex cavity (a combination of several interconnected cavities) to be filled with injected thermoplastic material. During molding, thermoplastic material is injected into the mold at a temperature of about 360° F. to about 480° F., filling the complex cavity between the rear-side mold member(s) and the front-side mold members, including the cavity for forming the rail 30, thereby forming a complete panel 10 of molten thermoplastic material. Next the mold is cooled, the cooling water typically lowering the surfaces of the mold members that are in contact with the panel 10 to a cooler temperature, such as ambient temperature. These molding and cooling steps are shown generally in FIG. 2A.

As the thermoplastic material is cooled, it begins to solidify. Once the surface temperature of the thermoplastic material has been lowered to between about 100° F. and 180° F., the mold can be opened without risking that the thermoplastic material will not hold its molded shape. As shown in FIG. 2B, the lifter mold 110 moves perpendicularly into the front side 22 of the panel body 20, thereby stripping the main portion 27 of the front side 22 of the panel body 20 from the stationary block mold 120.

Simultaneously, the slide mold 100 moves perpendicularly into the front side 22 of the upper end portion 26 of the panel body 20 at the same rate of speed as the lifter mold 110, and also parallel to the front side 22 and away from the lifter mold 110. In doing so, the surface 106 of the slide mold 100 disengages from the surface 116 of the lifter mold 110, the generally planar surface 104 of the slide mold 100 moves along the front side 22 of the panel body 20, and the concave surface 102 of the slide mold 100 disengages from the outer surface 32 of the rail 30.

Next, as shown in FIG. 2C, the slide mold 100 continues to move perpendicularly into the front side 22 of the panel body 20 while the lifter mold 110 ceases moving. As the slide mold 100 pushes the panel body 20 away from the lifter mold 110, the rail 30 flexes over the convex surface 112 of the lifter mold 110. As the tip 36 of the rail 30 passes over the convex surface 112 of the lifter mold 110, the rail 30 becomes momentarily approximately straight (as shown in dashed lines), before the rail 30 is released and springs back to its molded shape. Once the siding panel 10 is fully cooled, the rail 30 has sufficient strength and rigidity to perform its desired function of engaging the lip 42 of an overlapping panel 10.

Figure 3:
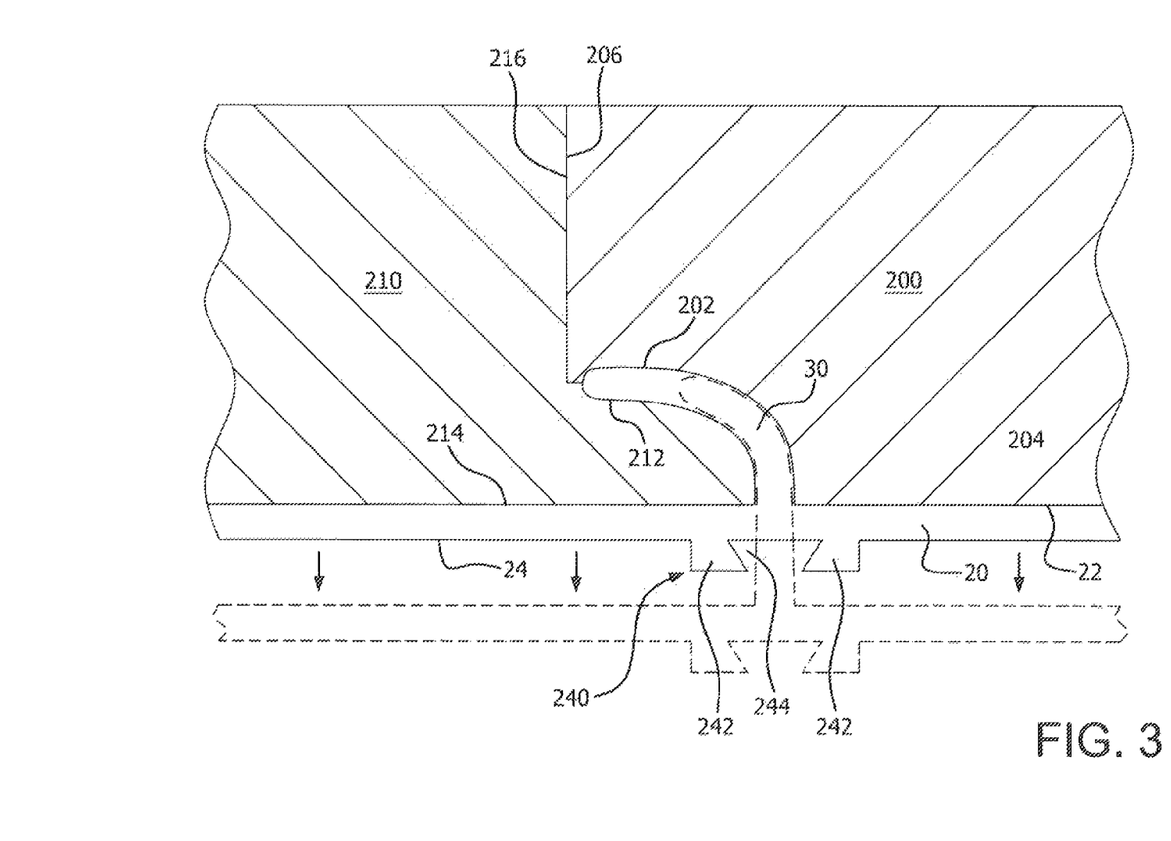
FIG. 3 is a side view showing another embodiment of a molding process in which a siding panel having continuous rail is injection molded, the continuous rail being formed in a cavity between first and second block molds, and in which the continuous rail is extracted from the mold by moving the siding panel generally perpendicularly away from the first and second block molds, the dotted line showing the panel in a partially pulled out position.

Another embodiment of an injection molding method is shown in FIG. 3, which depicts forming the front side 22 of a siding panel 10. Two front-side mold members are depicted on the front side 22 of the panel body 20, including a first block mold 200 and a second block mold 220. (Not shown are one or more rear-side mold members used to form the rear side 24 of the panel body.) As in the previous embodiment, the mold members are typically made from metal, typically steel, and are water-cooled to enable cooling and hardening of the molded thermoplastic siding panel 10.

The first block mold 200 and the second block mold 210 are shaped to define a cavity for forming the rail 30. The first block mold 200 is manufactured to include a generally planar face 204 for forming a part of the front side 22 of the upper end portion 26 of the panel body 20, and a generally concave surface 202 for forming the outer surface 32 of the rail 30. The second block mold 210 is manufactured to include a generally planar or contoured face 214 for forming the main portion 27 of the front side 22 of the panel body 20, and a generally convex surface 212 for forming the inner surface 34 of the rail 30. The first block mold 200 and the second block mold 210 contact one another at corresponding surfaces 206 and 216. The surfaces 206, 216 are necessary to enable the concave surface 202 and the convex surface 212 to be separately formed prior to assembling the first and second block molds 200, 210 together.

The rear surface 24 of the panel body 20 may be formed with an undercut feature 240 located opposite the rail 30 on the front side 22. In the depicted embodiment, the undercut feature 240 includes a pair of rails 242 having facing undercut surfaces bounding a cavity 244. Alternate embodiments of an undercut feature 240 can be used, including but not limited to features having a round shape, a plug shape, or another geometric configuration that can be engaged to pull the panel body 20 away from the first and second block molds 200, 210.

As in the previous embodiment, prior to molding, the mold is closed to place the front-side mold members and the rear-side mold member(s) in proximity to each other, leaving cavities to be filled with injected thermoplastic material. During molding, thermoplastic material is injected into the mold at a temperature of about 360° F. to about 480° F., filling the cavities between the rear-side mold member(s) and the front-side mold members, including the cavity for forming the rail 30, thereby forming a complete panel 10 of molten thermoplastic material. Next the mold is cooled, the cooling water typically lowering the surfaces of the mold members that are in contact with the panel 10 to a lower temperature, such as ambient temperature. As the thermoplastic material is cooled, it begins to solidify. Once the surface temperature of the thermoplastic material has been lowered to between about 100° F. and 180° F., the mold can be opened without risking that the thermoplastic material will not hold its molded shape.

To remove the panel body 20 from the first and second block molds 200, 210, and to facilitate removal of the rail 30 from the cavity formed by the surfaces 202, 212, a separate tool can be attached to the undercut feature 240 to assist in pulling the rail 30 out from the cavity. Alternatively, the tool can engage the undercut feature 240 and hold the panel in place as the mold is moved laterally away. Additionally, ejector pins may optionally be provided along the planar surfaces 204, 214 to push the panel body 20 away from the block molds 200, 210. As the panel body is pulled away from the block molds 200, 210, the rail 30 flexes as it is drawn outward between the convex surface 212 of the second block mold 210 and the concave surface 202 of the first block mold 200. When the tip 36 of the rail 30 has passed completely out of the cavity, the rail 30 is momentarily approximately straight, before the rail 30 is released and springs back to its molded shape. Once the siding panel 10 is fully cooled, the rail 30 has sufficient strength and rigidity to perform its desired function of engaging the lip 42 of an overlapping panel 10.

Various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A mold assembly for forming a siding panel having an upper portion with a continuous rail on one face thereof, the rail extending in a first direction along the siding panel and protruding outwardly and extending in a second direction substantially perpendicular to the first direction and substantially parallel to an intermediate portion of the siding panel so as to form an elongated hook shape, the upper portion having an upper face surface and an upper back surface, the intermediate portion having a face juxtaposed and spaced apart from a rear surface of the rail, the siding panel having a lower portion located below and contiguous with the intermediate portion, the lower portion extending below the rail, the lower portion having a lower face surface and a lower back surface, the mold assembly comprising:

a slide mold member having a first surface for defining the upper face portion of the siding panel, a second surface extending from the first surface and having a generally concave surface adapted to form the outer surface of the rail, and a mold contact surface adjacent to and extending generally laterally away from the concave surface;

a lifter mold member having a first surface for defining at least a portion of the face of the intermediate portion, a second surface extending from the first surface and having a generally convex surface portion for defining the inner surface of the rail, a first mold contact surface adjacent to and extending generally laterally away from the convex surface, and a second mold contact surface adjacent to and extending generally laterally away from the first surface;

a stationary block mold member having a first surface for defining at least a portion of the face of the lower portion, and a mold contact surface adjacent to and extending generally laterally away from the first surface; and a rear mold assembly having a rear mold surface for defining the back surface of the siding panel;

wherein said mold members and said rear mold assembly are configured so as to be arranged in a mold-defining configuration wherein the slider mold member and the stationary mold member are adjacent to and on opposite sides of the lifter mold member, and the rear mold surface of the rear mold assembly is adjacent to and spaced apart from the first surface of the slider mold member, the first surface of the stationary mold member, and the first surface of the lifter mold member so as to define a siding mold cavity in the spacing therebetween;

wherein from said mold-defining configuration the lifter mold member is movable in a direction substantially perpendicularly to and toward the rear mold assembly so as to move a siding panel molded in said siding mold cavity away from the first face of the stationary mold member;

wherein from said mold-defining configuration the slide mold member is movable in a direction substantially perpendicularly away from the first mold contact surface of the lifter mold member into a second configuration so as to separate a portion of the slide mold member from the lifter mold member; and wherein from said second configuration the slide mold member is movable in a direction substantially perpendicularly to and toward the rear mold assembly so as to move the molded siding panel away from the first surface of the lifter mold member and causing the rail to flex as it slides over the convex portion of the lifter mold member.

2. A mold assembly for forming a siding panel according to claim 1 wherein the mold contact surface of the slide mold member is adapted to be adjacent to and in contact with the first mold contact surface of the lifter mold member during the molding process.

3. A mold assembly for forming a siding panel according to claim 2 wherein the second mold contact surface of the lifter mold member is adapted to be adjacent to and in contact with the mold contact surface of the stationary block mold during the molding process.

4. A mold assembly for forming a siding panel according to claim 2 wherein a portion of the slide mold member is adapted to slide along a portion of the lifter mold member.

5. A method of forming a siding panel having an upper portion with a continuous rail on one face thereof, the rail extending in a first direction along the siding panel and protruding outwardly and extending in a second direction substantially perpendicular to the first direction and substantially parallel to an intermediate portion of the siding panel so as to form an elongated hook shape, the upper portion having an upper face surface and an upper back surface, the intermediate portion having a face juxtaposed and spaced apart from a rear surface of the rail, the siding panel having a lower portion located below and contiguous with the intermediate portion, the lower portion extending below the rail, the lower portion having a lower face surface and a lower back surface, the method comprising the steps of:

providing a slide mold member having a first surface for defining the upper face portion of the siding panel, a second surface extending from the first surface and having a generally concave surface portion adapted to form the outer surface of the rail, and a mold contact surface adjacent to and extending generally laterally away from the concave surface;

providing a lifter mold member having a first surface for defining at least a portion of the face of the intermediate portion, a second surface extending from the first surface and having a generally convex surface for defining the inner surface of the rail, a first mold contact surface adjacent to and extending generally laterally away from the convex surface, and a second mold contact surface adjacent to and extending generally laterally away from the first surface;

providing a stationary block mold member having a first surface for defining at least a portion of the face of the lower portion, and a mold contact surface adjacent to and extending generally laterally away from the first surface;

providing a rear mold assembly having a rear mold surface for defining the back surface of the siding panel;

arranging the slide mold member and the stationary mold member adjacent to and on opposite sides of the lifter mold member, and the rear mold assembly so as to locate the rear mold surface adjacent to and spaced apart from the first surface of the slider mold member, the first surface of the stationary mold member, and the first surface of the lifter mold member so as to define a siding mold cavity in the spacing therebetween;

injecting a molten plastic into the siding mold cavity;

allowing the molten plastic to cool to a temperature below its melting point so as to form the molded siding panel with a rail;

moving the lifter mold member in a direction substantially perpendicularly to and toward the rear mold assembly so as to move the molded siding panel away from the first face of the stationary mold member;

moving the slide mold member in a direction substantially perpendicularly away from the first mold contact surface of the lifter mold member so as to separate a portion of the slide mold member from the lifter mold member; and moving the slide mold member in a direction substantially perpendicularly to and toward the rear mold assembly so as to move the molded siding panel away from the first surface of the lifter mold member and causing the rail to flex as it slides over the convex portion of the lifter mold member.

6. A method of forming a siding panel according to claim 5 wherein the step of moving the slide mold member in a direction substantially perpendicularly away from the lifter mold member involving sliding the slide mold member on a portion of the lifter mold member.

7. A method of forming a siding panel according to claim 6 wherein the step of arranging the mold members involves placing the mold contact surface of the slide mold member in contact with the first mold contact surface of the lifter mold member.

8. A method of forming a siding panel according to claim 7 wherein the step of arranging the mold members involves placing the second mold contact surface of the lifter mold member in contact with the mold contact surface of the stationary block mold.

\* \* \* \* \*